United States Patent [19]

Woods et al.

[11] 3,862,194
[45] Jan. 21, 1975

[54] ALKYLATED 3,20-DIKETO-Δ⁴-STEROIDS OF THE PREGNANE SERIES

[75] Inventors: Gilbert Frederick Woods, Glasgow; James Cairns, Cumbernauld; George McGarry, Airdrie, all of Scotland

[73] Assignee: Akzona Incorporated, Asheville, N.C.

[22] Filed: Jan. 3, 1973

[21] Appl. No.: 320,777

[30] Foreign Application Priority Data
Jan. 12, 1972 Great Britain .................. 1534/72

[52] U.S. Cl........ 260/397.3, 260/397.4, 260/397.45
[51] Int. Cl. ........................................ C07c 169/34
[58] Field of Search ...... /Machine Searched Steroids

[56] References Cited
UNITED STATES PATENTS

| | | | |
|---|---|---|---|
| 3,064,017 | 11/1962 | Figdor et al. ................. | 260/397.45 |
| 3,114,750 | 12/1963 | Kirk et al. ..................... | 260/239.55 |
| 3,166,551 | 1/1965 | Burn et al. .................... | 260/239.55 |
| 3,594,407 | 7/1971 | Teller et al. ................... | 260/397.3 |

Primary Examiner—Henry A. French
Attorney, Agent, or Firm—Francis W. Young; Philip M. Pippenger; Hugo E. Weisberger

[57] ABSTRACT

The invention relates to novel alkylated steroids of the pregnane series having the formula:

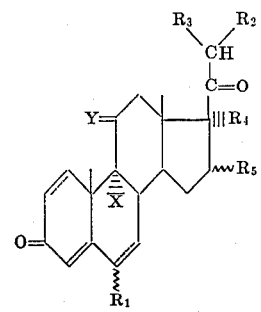

wherein
X = H or halogen,
Y = $H_2$, H(OH), H(OAcyl), O or H(halogen),
$R_1$ = H, $CH_3$ or halogen,
$R_2$ = an alkyl group having 1–4 carbon atoms,
$R_3$ = H or $R_2$,
$R_4$ = H (except when Y = $H_2$), OH OAcyl OAlkyl or $CH_3$,
$R_5$ = H or alkyl group having 1–4 carbon atoms, and in which at least one of the substituents $R_4$ and $R_5$ is an alkyl group, and
$C_1$–$C_2$ and $C_6$–$C_7$ are saturated or unsaturated bonds, and a process for obtaining same.

The novel compounds possess strong anti-inflammatory properties and are useful in the treatment of inflammatory conditions especially those associated with the skin and allergic reactions.

4 Claims, No Drawings

ALKYLATED 3,20-DIKETO-Δ⁴-STEROIDS OF THE PREGNANE SERIES

The present invention relates to novel alkylated steroids of the pregnane series and to a process for the preparation thereof.

More particularly, the invention relates to novel alkylated steroids of the formula:

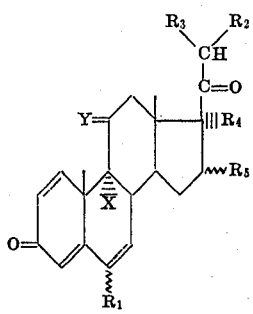

wherein
X = H or halogen,
Y = $H_2$, H(OH), H(OAcyl), O or H(halogen),
$R_1$ = H, $CH_3$ or halogen,
$R_2$ = an alkyl group having 1–4 carbon atoms,
$R_3$ = H or $R_2$,
$R_4$ = H (except when Y = $H_2$), OH, OAcyl, OAlkyl, or $CH_3$,
$R_5$ = H or an alkyl group having 1–4 carbon atoms and at least one of the substituents $R_4$ and $R_5$ is an alkyl group, and
$C_1$–$C_2$ and $C_6$–$C_7$ are saturated or unsaturated bonds.

The novel compounds of the invention possess strong anti-inflammatory properties when applied locally and cause little or no systemic thymolytic adrenolytic and salt-retaining effects. Consequently, they are very useful in the treatment of inflammatory conditions especially those associated with the skin and allergic reactions. These compounds can be administered topically in the form of ointments, creams, lotions or sprays and suppositories or by injection for instance intraarticularly for the local treatment of inflammation, possibly in combination with other active ingredients.

The compounds according to the invention may be prepared by 21-mono or 21,21-di-alkylation of 20-keto compounds of the pregnane series having the partial formula:

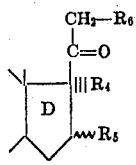

wherein
$R_4$ = H, OH, OAlkyl, OAcyl or $CH^3$,
$R_5$ = H or an alkyl group having 1–4 carbon atoms, and at least one of the substituents $R_4$ and $R_5$ is an alkyl group, and
$R_6$ = H, except where the enolate ion is generated with Grignard reagent, in which case it may be H or halogen.

Other substituents indicated in the formula of the end-products may be introduced subsequently by methods known per se.

21-Mono alkylation of a 20-keto pregnane has been carried out via the Mannich reaction by treating a 20-keto-pregnane with the salt of an amine, preferably a low alkyl amine, in the presence of formaldehyde, and converting the thus formed 21-aminomethyl compound into a quaternary ammonium derivative which is converted into a 21-methylene compound by treatment with base, and the 21-methylene derivative is either reduced catalytically to the desired 21-methyl compound or converted by 1,4-Grignardation to a 21-alkyl derivative. The drawbacks of this procedure are that yields are low and the sequence cannot be applied to the introduction of a second alkyl group at C-21.

We have found that known procedures for alkylating simple ketones for example forming the enolate salt with trityl lithium or with lithium dialkylamide followed by treatment with an alkyl halide, may also be applied to 20-keto-pregnanes to furnish exclusively the 21-mono alkyl derivatives in high yield.

An alternative method of 21-mono alkylation is to treat a 20-keto pregnane as defined above with a Grignard reagent in which case instead of the anticipated normal Grignard reaction at the 20-keto group the $\Delta_{20}$-enolate salt of the Grignard complex is formed and this may be alkylated at C-21 by treatment with an alkyl halide, preferably an alkyl iodide.

These same methods may be used for introducing a second alkyl group into the 21-monoalkyl derivative.

It is also possible to form the 21-mono- and 21,21-dialkyl derivatives from 20-keto pregnanes as defined above or to convert a 21-mono-alkyl derivative into the corresponding 21,21-di-alkyl derivative by reacting them with an alkali metal such as sodium or an alkali metal amide such as sodamide in a suitable solvent such as liquid ammonia followed by reaction with an alkyl halide, preferably an alkyl iodide. This method is, however, more suited to the preparation of 21,21-dialkyl derivatives in which case an excess of reagents may be used. When approximately one equivalent of alkali metal or alkali metal amide is used the product is a mixture from which the 21-mono-alkyl derivative can be separated as the main product.

In these alkylating procedures, if the starting material as defined above, contains a free hydroxyl group at C-17, this also becomes alkylated during the reaction sequence. However, a final product containing a free 17-hydroxyl group may be obtained by carrying out the 21-alkylation procedure on a 17-acyloxy derivative and hydrolysing the ester group under carefully controlled basic conditions after completion of the desired 21-alkylation.

Starting materials for the preparation of the compounds according to the invention are 20-keto pregnanes of the formula:

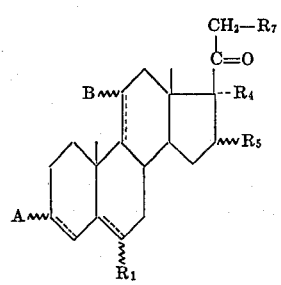

wherein
  $R_1$, $R_4$ and $R_5$ have the meanings defined above,
  A = a protected hydroxyl or keto group,
  B = hydrogen or a protected α- or β-hydroxyl group,
  $R_7$ = H or $R_2$ as defined above, except where the Grignard enolate ion is generated, in which case it may be H, $R_2$ or halogen, and
  $C_3$–$C_4$, $C_5$–$C_6$ and $C_9$–$C_{11}$ may be saturated or unsaturated.

During the alkylation procedure, it is preferable to protect an oxygen function at C-3 if one is present by reversible ether formation such as the tetrahydropyranyl ether in the case of a 3-hydroxyl group or a $\Delta^{3,5}$-enol ether in the case of a $\Delta^4$-3-keto grouping, or by ketal formation such as the dimethyl ketal in the case of a 3-keto group to prevent unwanted alkylation reactions such as O-alkylation which would take place at the same time as 21-alkylation if the starting material contained a free 3-hydroxyl group or 3-acyloxy group or to prevent unwanted C-alkylation reactions from taking place in the α-position to a free 3-keto group if such were present. It has been found that the 3-O-alkylated products which are formed if a free 3-hydroxyl group or its acyl derivative is present during the alkylation reaction are very difficult to hydrolyse back to the desired 3-hydroxyl group which is a necessary precursor for converting by oxidation to the 3-keto group in the final products according to the invention.

Similarly it is necessary to protect an 11-hydroxyl substituent if one is present in the starting material before carrying out the alkylation procedure to prevent the simultaneous formation of an 11-O-alkylated derivative which cannot be readily converted back to the free hydroxyl group. When an 11α-hydroxyl group is present, it is preferable to protect it by reversible ether formation such as the tetrahydropyranyl ether but when an 11β-hydroxyl substituent is present, because of its very sterically hindered position in the steroid molecule it is sufficient to protect it as an ester such as the acetate in which case the acyl group may itself undergo alkylation.

After introduction of the 21-mono- or 21,21-dialkyl substituents by the methods already described, other groups already present in the starting materials may be modified and new groups or functions may be introduced by methods known per se to furnish the desired end-products according to the invention.

A 3-hydroxyl group may be oxidised after hydrolysis of the protecting ether group, for example, by Oppenauer oxidation in the case of a $\Delta^5$-steroid to furnish a $\Delta^4$-3-keto steroid, or with chromic acid in the case of either a 5α- or 5β-3-hydroxy derivative to give the corresponding saturated 3-ketone.

Where a 3-keto group in the starting material is protected as its ketal derivative, or in the case of a $\Delta^4$-3-ketone, as the enol-ether for the purposes of the alkylation reaction, it is only necessary to hydrolyse it to regenerate the keto group.

In compounds containing a $\Delta^4$-3-keto grouping, additional double bonds may be introduced at positions $C_1$–$C_2$ and/or $C_6$–$C_7$ by known chemical means such as by reaction with suitable quinone derivatives or microbiologically with an appropriate micro-organism.

A 3-keto-5α-steroid may be converted to a $\Delta^{1,4}$-3-keto steroid by means of selenium dioxide or by reaction with a quinone such as dichlorodicyanbenzoquinone or by halogenation at positions 2 and 4 and subsequent dehydrohalogenation by methods known per se.

A 3-keto-5β-steroid may be converted into a $\Delta^4$-3-keto steroid by means of selenium dioxide or by monobromination at position 4 followed by dehydrobromination and the so formed $\Delta^4$-3-ketone may be transformed into the $\Delta^{1,4}$-3-ketone by further reaction with selenium dioxide or dichlorodicyanbenzoquinone. Alternatively, a 3-keto-5β-steroid may be converted directly into a $\Delta^{1,4}$-3-ketone by reaction with selenium dioxide or by reaction with a suitable quinone such as dichlorodicyanobenzoquinone, or by di-halogenation for example di-bromination at positions 2 and 4 and subsequent dehydrohalogenation by methods known per se.

A $\Delta^4$-3-keto steroid may be converted into the corresponding $\Delta^6$-derivative by reaction with a suitable quinone such as chloranil and the thus formed $\Delta^{4,6}$-3-keto compound may then be converted to the corresponding $\Delta^{1,4,6}$-3-keto derivative by reaction with an appropriate quinone such as dichlorodicyanobenzoquinone.

The microbiological introduction of a double bond at position $C_1$–$C_2$ may be carried out by incubation with a 1,2-dehydrogenating micro-organism, for example Corynbacterium Simplex, Bacillus sphaericus or Bacillus subtilis.

Introduction of a 6-substituent, if not already present may be effected if desired by converting a 3-hydroxy-$\Delta^5$-steroid into the 5α,6α-epoxide and treating the latter with methyl magnesium halide, a halogen acid, boron trifluoride or fluoroboric acid to give in each case the corresponding 5α-hydroxy-6β-substituted derivative which can then be converted into the corresponding $\Delta^4$-3-keto-6β-substituted compound by oxidising the 3-hydroxy group with, for example, chromic acid and dehydrating the 5-hydroxyl group appropriately under acid or basic conditions. Isomerisation of the 6β-substituent may be brought about by treatment with acid or base.

A $\Delta^{9(11)}$-double bond if present may be converted to the 9α-bromo-11β-hydroxy compound or an ester thereof by methods known per se and then transformed under basic conditions into a 9β,11β-epoxide which may be subsequently opened with a halogen acid to give the corresponding 9α-halo-11βhydroxy derivative which can then be oxidised to the corresponding 9α-halo-11-ketone.

Introduction of an 11-hydroxyl group may be performed microbiologically, e.g. by incubation with an 11-hydroxylating micro-organism such as Curvularia or a Rhizopus after which the 11-hydroxyl group may be oxidised to an 11-keto group, acylated or dehydrated to form a $\Delta^{9(11)}$-double bond.

A $\Delta^{9(11)}$-double bond may be converted to a 9,11-dihalogen derivative such as the dichloride by addition of a halogen such as chlorine.

After elaboration of the $\Delta^{1,4}$-3-keto group an 11β-acyloxy group, if present, may be hydrolysed to the corresponding 11β-hydroxy derivative under relatively mild conditions with alcoholic alkali and the so formed 11β-hydroxy group may then be oxidised if desired to the corresponding 11-ketone.

The invention is further illustrated by the following examples:

EXAMPLE 1

3β-Hydroxy-16α,17α,21-trimethyl-$\Delta^5$-pregnen-20-one

A mixture of 3β-hydroxy-16α,17α-dimethyl-Δ⁵-pregnen-20-one (25 g), dimethylamine hydrochloride (50 g), paraformaldehyde (15 g) and 2N hydrochloric acid (1.5 ml) was refluxed in iso-amyl alcohol (500 ml) for 2¼ hours, then further paraformaldehyde (15 g) was added. After a further hour, the cooled solution was shaken with water, and the crystalline solid thus obtained was filtered, washed with water then with ether and dried, to give 3β-hydroxy-16α,17α-dimethyl-21-dimethylaminomethyl-Δ⁵-pregnen-20-one hydrochloride (8.0 g).

The filtrate was washed to neutrality with brine, back-extracting the washings with iso-amyl alcohol. The organic phase was concentrated to low volume, diluted with ether/methylene chloride and left overnight in the refrigerator. After filtration, the solid was washed with methylene chloride and dried to give a further crop of the amine hydrochloride (1.0 g).

3β-Hydroxy-16α,17α-dimethyl-21-dimethylaminomethyl-Δ⁵-pregnen-20-one hydrochloride (8.9 g) was suspended in 1.0N potassium hydroxide (450 ml) and shaken with ether (900 ml) and methylene chloride (150 ml) for several minutes. The organic layer was then washed neutral with water, dried and evaporated to give the free amine as a crystalline solid. This was dissolved in methylene chloride (90 ml) and ethyl bromide (18 ml). The solution was allowed to stand overnight then the quaternary bromide (8.9 g) was filtered off and washed with methylene chloride.

The quaternary bromide salt was dissolved in 25% isopropanol in water (1900 ml) and saturated potassium bicarbonate (115 ml) was added. The fine precipitate which formed was extracted into ether (500 ml), and this extract was washed neutral with water, dried and evaporated to give a solid (6.4 g). This was dissolved in isopropanol (320 ml) and hydrogenated over 10% palladium/charcoal (0.7 g) for 30 minutes. The catalyst was removed by filtration and the solution was diluted with water to give a fine solid, which was extracted into methylene chloride (500 ml), dried and evaporated to give a gummy solid (6.0 g). Crystallisation from acetone/hexane gave pure 3β-hydroxy-16α,17α,21-trimethyl-Δ⁵-pregnen-20-one, m.p. 174°–177°C.

The above procedure, when carried out on 3β-hydroxy-16α,17α-dimethyl-Δ⁹⁽¹¹⁾-5α-pregnen-20-one and 3β-hydroxy-16β,17α-dimethyl-Δ⁹⁽¹¹⁾-5α-pregnene-20-one, furnished 3β-hydroxy-16α,17α,21-trimethyl-Δ⁹⁽¹¹⁾-5α-pregnen-20-one (m.p. 156°–157°C), and 3β-hydroxy-16β,17α,21-trimethyl-Δ⁹⁽¹¹⁾-5α-pregnen-20-one (m.p. 133°–134°C) respectively.

EXAMPLE 2

3β-Hydroxy-16α,17α,21-trimethyl-Δ⁵-pregnen-20-one

To a stirred solution of 3β-hydroxy-16α,17α-dimethyl-Δ⁵pregnen-20-one (1 g) in sodium-dried tetrahydrofuran (25 ml) under nitrogen was added a solution of trityl lithium in sodium-dried tetrahydrofuran until the red colour of trityl lithium just persisted. Methyl iodide (5 ml) was then added rapidly with vigorous stirring. After 30 minutes the solution was evaporated to dryness under vacuum. The residue, which was then a 3-methyl-ether, was dissolved in ether (10 ml), and acetic anhydrode (40 ml) and the solution was cooled to 0°C. Boron trifluoride diethyletherate (7 ml) previously cooled to 0°C, was added and the solution left in a refrigerator overnight, then poured on to ice. The gummy product (by now the 3-acetate) was hydrolysed with potassium carbonate in methanol, purified on a silica column, and crystallised from acetone/hexane to give 3β-hydroxy-16α,17α,21-trimethyl-Δ⁵-pregnen-20-one (0.6 g), m.p. 174°–178°C.

EXAMPLE 3

3β-Hydroxy-16α,17α,21-trimethyl-Δ⁵-pregnen-20-one

3β-Hydroxy-16α,17α-dimethyl-Δ⁵-pregnen-20-one 3-benzoate (1 g) was treated with trityl lithium and methyl iodide as described in Example 2. Hydrolysis with potassium hydroxide in methanol gave a mixture of the 3-alcohol and 3-methyl-ether which was converted to the 3-alcohol as in Example 2. Purification and cystallisation gave 3β-hydroxy-16α,17α,21-trimethyl-Δ⁵-pregnen-20-one (0.7 g) identical with that described in Example 1.

EXAMPLE 4

3β-Hydroxy-16α,17α,21-trimethyl-Δ⁵-pregnen-20-one

3β-Hydroxy-16α,17α-dimethyl-Δ⁵-pregnen-20-one 3-tetrahydropyranyl ether (1.45 g) was treated with trityl lithium and methyl iodide as described in Example 2. The crude product was dissolved in 80% acetic acid (25 ml) and warmed for 30 minutes. The solid which formed on addition of water was isolated by filtration, dried, and crystallised to give 3β-hydroxy-16α,17α,21-trimethyl-Δ⁵-pregnen-20-one (0.85 g) identical with that described in Example 1.

The same procedure when carried out on 3β,11α-dihydroxy-16α,17α-dimethyl-Δ⁵-pregnen-20-one bis-tetrahydropyranyl ether, and 16α,21-dimethyl-Δ⁹⁽¹¹⁾-5α-pregnene-3,20-dione 3-dimethylketal, resulted in the production of 3β,11α-dihydroxy-16α,17α,21-trimethyl-Δ⁵-pregnen-20-one (amorphous solid; and 16α,21,21-trimethyl-Δ⁹⁽¹¹⁾-5α-pregnene-3,20-dione (m.p. 156°–159°C), respectively.

EXAMPLE 5

3β-Hydroxy-16α,17α,21-trimethyl-Δ⁹⁽¹¹⁾-5α-pregnen-20-one

A solution of trityl lithium in dry THF was added to a stirred solution of 3β-hydroxy-16α,17α-dimethyl-Δ⁹⁽¹¹⁾-5α-pregnen-20-one 3-tetrahydropyranyl ether (7g) in dry THF (125 ml) under nitrogen at 0°C until a slight excess was present. Dry methyl iodide (25 ml) was then added rapidly with vigorous stirring and after 30 minutes the solution was evaporated to dryness under vacuum. The residue was hydrolysed in 80% acetic acid (60 ml) for 30 minutes on a steambath, cooled, and the product precipitated with water and isolated via ether/methylene chloride. The washed and dried extract was evaporated and the crude product was purified on a silica column and crystallised from acetone/hexane to give 3β-hydroxy-16α,17α,21-trimethyl-Δ⁹⁽¹¹⁾-5α-pregnen-20-one (4.2 g) m.p. 156°–157°C.

The above procedure, when carried out on 16α,17α-dimethyl-Δ⁹⁽¹¹⁾-5α-pregnene-3,20-dione 3-dimethylketal; 16α-methyl-Δ⁹⁽¹¹⁾-5α-pregnene-3,20-dione 3-dimethylketal; 16α-methyl-17α-hydroxy-Δ⁹⁽¹¹⁾-5α-pregnene-3,20-dione 3-dimethyl ketal 17-acetate; 16α-methyl-17α-hydroxy-Δ⁹⁽¹¹⁾-5α-pregnane-3,20-dione 3-dimethyl ketal; 16β,17α-dimethyl-Δ⁹⁽¹¹⁾-5α-pregnene-3,20-dione 3-dimethyl ketal; 16α,17α,21-trimethyl-Δ⁹⁽¹¹⁾-5α-pregnene-3,20-dione 3-dimethyl ketal; 16α,17α,21-trimethyl-Δ⁹⁽¹¹⁾-5β-pregnene-3,20- dione 3-dimethyl ketal; 16α,17α-dimethyl-Δ$^{9(11)}$-5β-pregnene-3,20-dione 3-dimethylketal; and 6-fluoro-16α,17α-dimethyl-Δ$^5$-pregnene-3,20-dione-3-ethyleneketal, furnished 16α,17α,21-trimethyl-Δ$^{9(11)}$-5α-pregnene-3,20-dione (m.p. 173°–176°C); 16α,21-dimethyl-Δ$^{9(11)}$-5α-pregnene-3,20-dione (m.p. 157°–159°C); 16α,21-dimethyl-17α-hydroxy-Δ$^{9(11)}$-5α-pregnene-3,20-dione 17 acetate (m.p. 198°–204°C); 16α,21-dimethyl-17α-hydroxy-Δ$^{9(11)}$-5α-pregnene-3,20-dione 17-methyl ether (m.p. 189°–194°C); 16β,17α,21-trimethyl-Δ$^{9(11)}$-5α-pregnene-3,20-dione (m.p. 170°–172°C); 16α,17α,21,21-tetramethyl-Δ$^{9(11)}$-5α-pregnene-3,20-dione (m.p. 126°–133°C); 16α,17α,21,21-tetramethyl-Δ$^{9(11)}$-5β-pregnene-3,20-dione (m.p. 113°–116°C); 16α,17α,21-trimethyl-Δ$^{9(11)}$-5β-pregnene-3,20-dione (m.p. 185°–189°C); and 6α-fluoro-16α,17α,21-trimethyl-Δ$^4$-pregnene-3,20-dione (m.p. 193.5°–197.5°C), respectively.

EXAMPLE 6

3β-Hydroxy-16α,17α,21-trimethyl-Δ$^5$-pregnen-20-one

To a stirred solution of 3β-hydroxy-16α,17α-dimethyl-21-bromo-Δ$^5$-pregnen-20-one 3-acetate (10 g) in sodium-dried tetrahydrofuran (250 ml) under nitrogen was added dropwise methyl magnesium chloride (1.0N in tetrahydrofuran, 35 ml). After 5 minutes, dry methyl iodide (50 ml) was added and the solution was heated under reflux overnight. The methyl iodide was removed by evaporating and the cooled residue was poured into ammonium chloride solution. The product, after hydrolysis by potassium hydroxide in methanol, was a mixture of 3β-hydroxy-16α,17α-dimethyl-Δ$^5$-pregnen-20-one, 3β-hydroxy-16α,17α,21-trimethyl-Δ$^5$-pregnen-20-one, and 3β-hydroxy-16α,17α,21,21-tetramethyl-Δ$^5$-pregnen-20-one. Chromatography on silica gave a mixture of the trimethyl and tetramethyl derivatives which was purified by crystallisation from acetone/hexane to give 3β-hydroxy-16α,17α,21-trimethyl-Δ$^5$-pregnen-20-one (2.0g) (m.p. 174°–177°C) identical with that described in Example 1.

EXAMPLE 7

3β-Hydroxy-16α,17α,21-trimethyl-Δ$^5$-pregnen-20-one

To stirred liquid ammonia (400 ml) refluxing under a drikold condenser, was added sodium (3.3 g) in small pieces. When the blue colour of the sodium solution had been discharged (this may be catalysed by the addition of a ferric salt) 3β-hydroxy-16α,17α-dimethyl-Δ$^5$-pregnen-20-one (10 g) dissolved in sodium-dried tetrahydrofuran (200 ml) was added dropwise. After stirring for 1.75 hours, dry methyl iodide (50 ml) diluted with tetrahydrofuran (200 ml) was added dropwise. The solution was then stirred overnight, allowing the ammonia to evaporate. The residue was treated with a solution of ammonium chloride (6.0 g) in water (200 ml) and the mixture was extracted with ether (500 ml). The aqueous layer was again extracted with ether (2 × 250 ml), and the combined ethereal extracts were washed with dilute hydrochloric acid, sodium thiosulphate solution, and water to neutrality, dried and evaporated. The residue was treated with boron trifluoride/acetic anhydride, then hydrolysed to the 3-alcohol as described in Ex. 2. The product was a mixture of starting material, 3β-hydroxy-16α,17α,21-trimethyl-Δ$^5$-pregnen-20-one, and a small amount of 3β-hydroxy-16α,17α,21,21-tetramethyl-Δ$^5$-pregnen-20-one, from which 3β-hydroxy-16α,17α,21-trimethyl-Δ$^5$-pregnen-20-one (3.5 g), m.p. 174°–177°C was isolated by the method described in Example 6, and shown to be identical with the sample described in Example 1.

EXAMPLE 8

3β,11β-Dihydroxy-16α,17α,21-trimethyl-5α-pregnan-20-one 11-acetate

A solution of 3β,11β-dihydroxy-16α,17α-dimethyl-5α-pregnan-20-one 2-tetrahydropyranyl ether 11-acetate (2 g) in dry tetrahydrofuran (20 ml) was added to a stirred solution of lithium di-isopropylamide (1.1 mole equivalents) in tetrahydrofuran (20 ml) under nitrogen at −25°C. After 30 minutes, the solution was allowed to warm to −5°C, methyl iodide (10 ml) was added and the reaction allowed to warm to room temperature. After which it was evaporated to dryness under reduced pressure. The residue was dissolved in 80% acetic acid and allowed to stand overnight. Addition of water gave a crystalline solid which was filtered, washed with water, dried and crystallised to give 3β,11β-dihydroxy-16α,17α,21-trimethyl-5α-pregnan-20-one 11-acetate (m.p. 178°–181°C).

Repeat of the above procedure on 11β-hydroxy-16α,17α-dimethyl-5α-pregnen-3,20-dione 3-dimethylketal 11-acetate gave 11β-hydroxy-16α,17α,21-trimethyl-5α-pregnane-3,20-dione 11-acetate (m.p. 158°–163°).

EXAMPLE 9

3α,11β-Dihydroxy-16α,17α,21-trimethyl-5β-pregnan-20-one 11-propionate and 3α,11β-dihydroxy-16α,17α,21-trimethyl-5β-pregnan-20-one 11-isobutylate A solution of 3α,11β-dihydroxy-16α,17α-dimethyl-5β-pregnan-20-one 3-tetrahydropyranyl ether 11-acetate (2 g) in dry tetrahydrofuran (20 ml) was added to a stirred solution of lithium di-isopropylamide (2.2 mole equivalents) in tetrahydrofuran under nitrogen at −25°C. The temperature was allowed to rise to −5°C. and methyl iodide (10 ml) was added. The product was hydrolysed and worked up as described in Example 8 and isolated via methylene chloride to give a non-crystalline mixture of 3α,11β-dihydroxy 16α,17α,21-trimethyl-5β-pregnan-20-one 11-propionate and 3α,1 1β-dihydroxy-16α,17α,21-trimethyl-5β-pregnan-20-one 11-isobutyrate (5:1).

The same procedure when carried out on 11β-hydroxy-16α,17α-dimethyl-5β-pregnane-3,20-dione 3-dimethylketal 11-acetate gave a non-crystalline mixture of 11β-hydroxy-16α,17α,21-trimethyl-5β-pregnane-3,20-dione 11-propionate and 11β-hydroxy-16α,17α,21-trimethyl-5β-pregnane-3,20-dione 11-isobutyrate.

EXAMPLE 10

3β-Hydroxy-16α,17α,21,21-tetramethyl-Δ$^5$-pregnen-20-one

To stirred liquid ammonia (40 ml), refluxing under drikold condenser, was added sodium (1 g) in small pieces. When the blue colour of the sodium solution had been discharged (this may be catalysed by the addition of a ferric salt), 3β-hydroxy-16α,17α-dimethyl-Δ$^5$-pregnen-20-one (1 g) dissolved in sodium-dried tetrahydrofuran (20 ml) was added slowly. After 1.5 hours, dry methyl iodide (5 ml) in tetrahydrofuran (20 ml) was added dropwise. After stirring overnight, allowing the ammonia to evaporate, a solution of ammonium chloride (0.6 g) in water (20 ml) was added and the resulting mixture was extracted with ether (50 ml). The aqueous phase was again extracted with ether (2 × 25 ml) and the combined extracts were washed with dilute hydrochloric acid, sodium thiosulphate solution and water, dried and evaporated to give the product as a gummy solid. This 3-methyl-ether was dissolved in ether (15 ml) and treated with boron trifluoride diethyl etherate (7 ml) and acetic anhydride (40 ml) at 0°C overnight, then poured on to ice. This product was filtered, hydrolysed with potassium carbonate in methanol, and crystallised from acetone/ether to give 3β-hydroxy-16α,17α,21,21-tetramethyl-Δ⁵-pregnen-20-one (0.7 g), m.p. 151°–166°C.

EXAMPLE 11

3β-Hydroxy-16α,17α,21,21-tetramethyl-Δ⁵-pregnen-20-one

3β-Hydroxy-16α,17α-dimethyl-Δ⁵-pregnen-20-one 3-tetrahydropyranyl ether (1.4 g) was treated with sodium (1 g) in ammonia (40 ml) and methyl iodide (5 ml) as described in Ex. 10. The crude product was dissolved in in 80% acetic acid (12 ml) and warmed for 30 minutes. The solid which formed on addition of water was isolated by filtration, dried and crystallised from acetone/ether to give 3β-hydroxy-16α,17α,21,21-tetramethyl-Δ⁵-pregnen-20-one (0.85 g) identical with that isolated in Example 10.

The above procedure, when carried out in 16α,17α-dimethyl-Δ⁹⁽¹¹⁾-5α-pregnene-3,20-dione 3-dimethylketal, furnished 16α,17α,21,21-tetramethyl-Δ⁹⁽¹¹⁾-5α-pregnene-3,20-dione (m.p. 126°–133°C).

EXAMPLE 12

3β-Hydroxy-16α,17α,21,21-tetramethyl-Δ⁵-pregnene-20-one

To a stirred solution of 3β-hydroxy-16α,17α,21-trimethyl-Δ⁵-pregnen-20-one (2 g) and cupric acetate (0.1 g) in sodium-dried tetrahydrofuran (100 ml) under nitrogen at room temperature was slowly added methyl magnesium bromide solution (1.0N in tetrahydrofuran) (60 ml). The solution was stirred for 3 hours, then dry methyl iodide (20 ml) was added and the mixture was heated under reflux overnight. The methyl iodide was then removed by evaporation and the cooled solution was poured into water (300 ml) containing ammonium chloride (10 g) and sodium thiosulphate (5 g). The solid product was filtered, washed with water and dried.

The product was again treated by the same procedure and in all the reaction was repeated five times, each time using the thoroughly dried product from the previous reaction.

The final product was chromatographed on silica, and crystallised from acetone/ether to give 3β-hydroxy-16α,17α,21,21-tetramethyl-Δ⁵-pregnen-20-one (0.5 g) identical with that isolated in Example 10.

EXAMPLE 13

16α,17α,21-Trimethyl-Δ⁹⁽¹¹⁾-5α-pregnene-3,20-dione

A solution of 3β-hydroxy-16α,17α,21-trimethyl-Δ⁹⁽¹¹⁾-5α-pregnen-20-one (5.2 g) in acetone (50 ml) was treated with 8N chromic acid solution (7 ml) over ten minutes with external cooling. Excess reagent was destroyed with isopropanol and the mixture was filtered, washed and dried to give 16α,17α,21-trimethyl-Δ⁹⁽¹¹⁾-5α-pregnene-3,20-dione (4.9 g), m.p. 173°–176°C.

The above procedure, when carried out on 3β-hydroxy-16β,17α,21-trimethyl-Δ⁹⁽¹¹⁾-pregnen-20-one; and 3β,11β-dihydroxy-16α,17α,21-trimethyl-5α-pregnan-20-one 11-acetate; gave 16β,17α,21-trimethyl-Δ⁹⁽¹¹⁾-5α-pregnene-3,20-dione (m.p. 170°–171.5°C); and 11β-hydroxy-16α,17α-21-trimethyl-5α-pregnane-3,20-dione 11-acetate (m.p. 158°–163°C) respectively.

EXAMPLE 14

16α,17α-21-Trimethyl-Δ⁹⁽¹¹⁾-5α-pregnene-3,20-dione

A solution of 16α,17α-dimethyl-Δ⁹⁽¹¹⁾-5α-pregnene-3,20-dione 3-dimethylketal (2 g) in sodium-dried tetrahydrofuran (50 ml) was slowly added to a stirred solution of lithium di-isopropylamide (1.5 mole equivalents; prepared from 1.23 ml di-isopropylamine) in tetrahydrofuran (8 ml) under nitrogen at 0°C. The solution was stirred for 30 minutes, allowing it to warm to room temperature, then was again cooled to 0°C, and methyl iodide (10 ml) was added rapidly with vigorous stirring. The cooling bath was again removed and after stirring for 30 minutes the solution was concentrated under vacuum to remove methyl iodide. 80% Acetic acid (25 ml) was added, and the solution was allowed to stand overnight. The product was precipitated as a crystalline solid by the slow addition of water. It was filtered, washed with water and dried to give 16α,17α,21-trimethyl-Δ⁹⁽¹¹⁾-5α-pregnene-3,20-dione (1.8 g), m.p. 173°–176°C.

EXAMPLE 15

16α,17α,21-Trimethyl Δ⁹⁽¹¹⁾-5α-pregnene-3,20-dione

A solution of 16α,17α-dimethyl-Δ⁹⁽¹¹⁾-5α-pregnene-3,20-dione 3-dimethylketal (1 g) in sodium-dried tetrahydrofuran (25 ml) was slowly added to a stirred solution of lithium diethylamide (1.5 mole equivalents; prepared from 0.45 ml diethylamine) in tetrahydrofuran (4 ml) under nitrogen at 0°C. Dry methyl iodide (5 ml) was subsequently added and the reaction was carried out and worked up exactly as described in Example 14 to give 16α,17α,21-trimethyl-Δ⁹⁽¹¹⁾-5α-pregnene-3,20-dione (0.9 g), identical with that prepared in Example 14.

EXAMPLE 16

16α,17α,21-Trimethyl-Δ⁴-pregnene-3,20-dione

A solution of 3β-hydroxy-16α,17α,21-trimethyl-Δ⁵-pregnen-20-one (10 g) in dry toluene (100 ml) and cyclohexane (50 ml) was treated with a solution of aluminum isopropoxide (5 g) in toluene (50 ml). The mixture was heated under reflux for 45 min. then cooled and treated with a solution of Rochelle salt (20 g) in water (50 ml). The mixture was steam-distilled until the distillate was clear and the product was filtered, dried, and purified on alumina to give 16α,17α,21-trimethyl-Δ⁴-pregnene-3,20-dione (7.72 g; m.p. 165°–170°C).

EXAMPLE 17

3-Ethoxy-16α,17α-dimethyl-Δ³,⁵-pregnadien-20-one

16α,17α-Dimethyl-Δ⁴-pregnene-3,20-dione (5 g) was suspended in dry dioxan (50 ml) and ethyl orthoformate (5 ml) and p-toluenesulphonic acid (250 mg)

added. The mixture was stirred at room temperature for 2½ hours and a further portion of ethyl orthoformate (5 ml) added. After another hour the reaction mate was worked up by addition of pyridine (2 ml) followed by 5% potassium carbonate solution (10 ml) then water. The yellow crystalline solid was filtered, washed, dried, and purified on a column of alumina to give 3-ethoxy-16α,17α-dimethyl-$\Delta^{3,5}$-pregnadien-20-one (4.13 g).

EXAMPLE 18

16α,17α,21-Trimethyl-$\Delta^4$-pregnadiene-3,20-dione

A solution of 3-ethoxy-16α,17α-dimethyl-$\Delta^{3,5}$-pregnadien-20-one (1 g) in dry tetrahydrofuran (25 ml) was added to a stirred solution of lithium di-isopropylamide (1.5 mole equivalents) in dry tetrahydrofuran (10 ml) at 0°C under nitrogen, and the mixture allowed to come to room temperature. Methyl iodide (5 ml) was then added and the reaction stirred for a further 30 minutes. Excess methyl iodide was evaporated under reduced pressure and the residue poured into sodium sulphite solution. The product was filtered, washed, and dissolved in aqueous acetic and heated for 30 min. on a steam bath. The solid which formed on dilution with water was filtered, washed, dried and purified on silica to give 16α,17α,21-trimethyl-$\Delta^4$-pregnene-3,20-dione (m.p. 166°–170°C).

EXAMPLE 19

16α,17α,21-Trimethyl-$\Delta^{1,4}$-pregnadiene-3,20-dione

A solution of 16α,17α-dimethyl-$\Delta^{1,4}$-pregnadiene-3,20-dione (1.0 g) in dry tetrahydrofuran (20 ml) was added to a stirred solution of lithium di-isopropylamide (2.5 mole equivalents) in tetrahydrofuran (20 ml) at 0°C under nitrogen. The solution was allowed to come to room temperature over 30 minutes and then methyl iodide (10 ml) was added. After a further 30 minutes the reaction mixture was diluted with water, the product filtered, washed, dried, and purified on an alumina column to give 16α,17α,21-trimethyl-$\Delta^{1,4}$-pregnadiene-3,20-dione (m.p. 164°–165°C).

EXAMPLE 20

16α,17α,21-Trimethyl-$\Delta^{1,4,9(11)}$-pregnatriene-3,20-dione

To a stirred solution of 16α,17α,21-trimethyl-$\Delta^{9(11)}$-5β-pregnene-3,20-dione (30 g) in chloroform (300 ml) and acetic acid (15 ml) at 0°C was added a solution of hydrogen bromide in acetic acid (6 ml). Bromine (9.3 ml) as a 10% solution in chloroform, was added dropwise followed by 10% sodium acetate solution until the reaction solution was no longer acid to Congo Red.

The organic layer was diluted with methylene chloride, washed with sodium carbonate solution, then with water to neutrality, dried and evaporated to give 2β,4β-dibromo-16α,17α,21-trimethyl-$\Delta^{9(11)}$-5β-pregnene-3,20-dione (45 g). This total product was added to a stirred suspension of calcium carbonate (45 g) and lithium bromide (22.5 g) in dimethylacetamine (900 ml) under nitrogen, boiled for 10 minutes, cooled and poured into stirred water (5,000 ml) and acetic acid (90 ml). The product was filtered, washed with water, dissolved in benzene and dried over sodium sulphate, and the dried solution run through an alumina column. The column was washed with ether, and the combined eluates were evaporated to dryness. The residue was purified on a silica column and crystallised from methylene chloride/methanol to give 16α,17α,21-trimethyl-$\Delta^{1,4,9(11)}$-pregnatriene-3,20-dione (9 g), m.p. 170°–175°C.

EXAMPLE 21

16α,17α,21-Trimethyl-$\Delta^{1,4,9(11)}$-pregnatriene-3,20-dione

16α,17α,21-Trimethyl-$\Delta^{9(11)}$-5α-pregnene-3,20-dione (5.2 g) in toluene (60 ml) was heated under reflux for 18 hours with dichlorodicyanobenzoquinone (7.6 g). The cooled reaction mixture was filtered and the filtrate was washed with water, and potassium carbonate solution, dried over sodium sulphate, and passed through a short column of alumina. The eluate and washings were evaporated to dryness and the residue was dissolved in ethanol (30 ml) containing 10% acetic acid. This solution was refluxed for 2 hours with Girard's Reagent P (1 g), then poured into dilute sodium hydroxide solution, and extracted into methylene chloride. The extract was washed with water, dried over sodium sulphate, evaporated to dryness, and the residue crystallised from acetone/ether to give 16α,17α,21-trimethyl-$\Delta^{1,4,9(11)}$-pregnatriene-3,20-dione (2 g), m.p. 170°–175°C.

The above procedure, when carried out on 16α,17α,-21-trimethyl-$\Delta^{9(11)}$-5β-pregnene-3,20-dione; 16α,17α,-21,21-tetramethyl-$\Delta^{9(11)}$-5α-pregnene-3,20-dione; 16-α,17α,21,21-tetramethyl-$\Delta^{9(11)}$-5β-pregnene-3,20-dione; 16α,21-dimethyl-$\Delta^{9(11)}$-5α-pregnene-3,20-dione; 16α,21,21-trimethyl-$\Delta^{9(11)}$-5α-pregnene-3,20-dione; 16β,17α,21-trimethyl-$\Delta^{9(11)}$-5α-pregnene-3,20-dione; 11β-hydroxy-16α,17α,21-trimethyl-5α-pregnane-3,20-dione 11-acetate and 16α,17α-dimethyl-21-ethyl-$\Delta^{9(11)}$-5α-pregnene-3,20-dione; furnished 16α,17α,21-trimethyl-$\Delta^{1,4,9(11)}$-pregnatriene-3,20-dione (m.p. 170°–175°C); 16α,17α,21,21-tetramethyl-$\Delta^{1,4,9(11)}$-pregnatriene-3,20-dione (m.p. 148°–151°C); 16α,17α,-21,21-tetramethyl1$\Delta^{1,4,9(11)}$-pregnatriene-3,20-dione (m.p. 148°–151°C); 16α,21-dimethyl-$\Delta^{1,4,9(11)}$-pregnatriene-3,20-dione (m.p. 142°–146°C); 16α,21,21-trimethyl-$\Delta^{1,4,9(11)}$-pregnatriene-3,20-dione (m.p. 158°–161°C); 16β,17α,21-trimethyl-$\Delta^{1,4,9(11)}$-pregnatriene-3,20-dione (m.p. 205°–207°C); 11β-hydroxy-16α,17α,21-trimethyl-$\Delta^{1,4}$-pregnadiene-3,20-dione 11-acetate (m.p. 203°–205°C); and 16α,17α-dimethyl-21-ethyl-$\Delta^{1,4,9(11)}$-pregnatriene-3,20-dione (m.p. 129°–132°C) respectively.

EXAMPLE 22

11β-Hydroxy-16α,17α,21-trimethyl-$\Delta^{1,4}$-pregnadiene-3,20-dione 11-propionate and 11β-hydroxy-16α,17α,21-trimethyl-$\Delta^{1,4}$-pregnadiene-3,20 11-isobutyrate The mixture of 11β-hydroxy-16α,17α,21-trimethyl-5β-pregnane-3,20-dione 11-propionate and 11β-hydroxy-16α,17α,21-trimethyl-5β-pregnane-3,20-dione 11-isobutyrate (1.9 g) (prepared as described in example 9) was dehydrogenated exactly as described in example 21. The crude product was purified by chromatography on silica to give 11β-hydroxy-16α,17α,21-trimethyl-$\Delta^{1,4}$-pregnadiene-3,20-dione 11-propionate (m.p. 152°–154°C) and 11β-hydroxy-16α,17α,21-trimethyl-$\Delta^{1,4}$-pregnadiene-3,20-dione 11-isobutyrate (m.p. 189°–197°C).

EXAMPLE 23

9β,11β-Epoxy-16α,17α,21-trimethyl-Δ$^{1,4}$-pregnadiene-3,20-dione

A solution of 16α,17α,21-trimethyl-Δ$^{1,4,9(11)}$-pregnatriene-3,20-dione (2 g) in DMF (24 ml) containing perchloric acid (0.4 ml) was stirred at room temperature for 2 hours with N-bromosuccinimide (1.55 g) in the absence of light. Excess reagent was destroyed with sodium bisulphite solution, and the reaction mixture was poured into water. The product was filtered and dried to give 9α-bromo-11β-hydroxy-16α,17α,21-trimethyl-Δ$^{1,4}$-pregnadiene formate (2.6 g).

The bromo-formate (2.6 g) was suspended in methanol (30 ml) and stirred under nitrogen with a solution of sodium methoxide in methanol (6 ml; 1.1N) for half an hour. The solution was neutralised with acetic acid and diluted with water. The gummy product was extracted into ether, washed neutral, dried and purified on a short column of alumina, and finally crystallised from ether to give 9β,11β-epoxy-16α,17α,21-trimethyl-Δ$^{1,4}$-pregnadiene-3,20-dione (1.5 g), m.p. 125°-131°.

Repeat of the above procedure on 16α,17α,21,21-tetramethyl-Δ$^{1,4,9(11)}$-pregnatriene-3,20-dione; 6α-fluoro-16α,17α,21-trimethyl-Δ$^{1,4,9(11)}$-pregnatriene-3,20-dione; 16α,21-dimethyl-Δ$^{1,4,9(11)}$-pregnatriene-3,20-dione; 16α,21,21-trimethyl-Δ$^{1,4,9(11)}$-pregnatriene-3,20-dione; 16β,17α,21-trimethyl-Δ$^{1,4,9(11)}$-pregnatriene-3,20-dione; and 16α,17α-dimethyl-21-ethyl-Δ$^{1,4,9(11)}$-pregnatriene-3,20-dione furnished 9β,11β-epoxy-16α,17α,21,21-tetramethyl-Δ$^{1,4}$-pregnadiene-3,20-dione (m.p. 146°-153°C); 6α-fluoro-9β,11β-epoxy-16α,17α,21-trimethyl-Δ$^{1,4}$-pregnadiene-3,20-dione (m.p. 180°-182°C); 9β,11β-epoxy-16α,21-dimethyl-Δ$^{1,4}$-pregnadiene-3,20-dione (m.p. 153°-158°C); 9β,11β-epoxy-16α,21,21-trimethyl-Δ$^{1,4}$-pregnadiene-3,20-dione (m.p. 135°-142°C). 9β,11β-epoxy-16β,17α,21-trimethyl-Δ$^{1,4}$-pregnadiene-3,20-dione (m.p. 138°-140°C); and 9β,11β-epoxy-16α,17α-dimethyl-21-ethyl-Δ$^{1,4}$-pregnadiene-3,20-dione (non-crystalline) respectively.

EXAMPLE 24

9α-Fluoro-11β-hydroxy-16α,17α,21-trimethyl-Δ$^{1,4}$-pregnadiene-3,20-dione

Gaseous hydrogen fluoride was passed into a mixture of ethanol-free dry chloroform (2 ml) and tetrahydrofuran 95 ml) at −40° until 3 g had been absorbed. 9β,1-1β-Epoxy-16α,17α,21-trimethyl-Δ$^{1,4}$-pregnadiene-3,20-dione (1.2 g) in dry chloroform (6 ml) was added to a solution of hydrogen fluoride (3 g) in chloroform (2 ml) and tetrahydrofuran (5 ml) at −40°C and washed in with more chloroform (7 ml). The reaction mixture was left in an ice-bath for 4 hours, and then poured carefully into ice-water containing potassium carbonte (20 g.) The solvent was evaporated and the resulting solid was filtered, washed and dried. The crude product was purified on a silica column and crystallised from acetone/ether to give 9α-fluoro-11β-hydroxy-16α,17α,21-trimethyl-Δ$^{1,4}$-pregnadiene-3,20-dione (660 mg), m.p. 226°-241°.

The same procedure, when carried out on 9β,11β-epoxy-16α,17α,21,21-tetramethyl-Δ$^{1,4}$-pregnadiene-3,20-dione; 6α-fluoro-9β,11β-epoxy-16α,17α,21-trimethyl-Δ$^{1,4}$-pregnadiene-3,20-dione; 9β,11β-epoxy-16α,21-dimethyl-Δ$^{1,4}$-pregnadiene-3,20-dione; 9β,11β-epoxy-16α,21,21,-trimethyl-Δ$^{1,4}$-pregnadiene-3,20-dione; 9β,11β-epoxy-16β,17α,21-trimethyl-Δ$^{1,4}$-pregnadiene-3,20-dione; and 9β,11β-epoxy-16α,17α-dimethyl-21-ethyl-Δ$^{1,4}$-pregnadiene-3,20-dione; gave 9α-fluoro-11β-hydroxy-16α,17α,21,21-tetramethyl-Δ$^{1,4}$-pregnadiene-3,20-dione (m.p. 238°-244°C); 6α,9-α-difluoro-11β-hydroxy-16α,17α,21-trimethyl-Δ$^{1,4}$-pregnadiene-3,20-dione (m.p. 252°-265°); 9α-fluoro-11β-hydroxy-16α,21-dimethyl-Δ$^{1,4}$-pregnadiene-3,20-dione (m.p. 247°-248°C); 9α-fluoro-11β-hydroxy-16α,21,21-trimethyl-Δ$^{1,4}$-pregnadiene-3,20-dione (m.p. 235°-237°C); 9α-fluoro-11β-hydroxy-16β,17α,21-trimethyl-Δ$^{1,4}$-pregnadiene-3,20-dione (m.p. 200°-201°C); and 9α-fluoro-11β-hydroxy-16α,17α-dimethyl-21-ethyl-Δ$^{1,4}$-pregnadiene-3,20-dione (m.p. 212°-221°C) respectively.

EXAMPLE 25

9α-Chloro-11β-hydroxy-16α,17α,21-trimethyl-Δ$^{1,4}$-pregnadiene-3,20-dione

16α,17α,21-Trimethyl-Δ$^{1,4,9(11)}$-pregnatriene-3,20-dione (500 mg) were dissolved in 10% aqueous dioxan (20 mls) cooled to 10°C and 72% perchloric acid (0.1 ml) was added followed by N-chloro succinimide (0.3 g) and the reaction stirred overnight. The product was watered out, filtered, dried and recrystallised from methylene chloride to give 9α-chloro-11β-hydroxy-16α,17α,21-trimethyl-Δ$^{1,4}$-pregnadiene-3,20-dione (350 mg), m.p. 257°-259°C.

EXAMPLE 26

9α,11β-Dichloro-16α,17α,21-trimethyl-Δ$^{1,4}$-pregnadiene-3,20-dione

16α,17α,21-Trimethyl-Δ$^{1,4,9(11)}$-pregnatriene-3,20-dione (850 mg) was dissolved in a mixture of chloroform (45 ml) and pyridine (5 ml). Dry chlorine was passed into the solution for 45 seconds, and the reaction was then stirred for 30 minutes at room temperature. The excess chlorine was destroyed by addition of sodium sulphite solution, and the mixture was filtered to remove sulphur. The organic phase was washed successively with water, 2N HCl, water, saturated potassium bicarbonate solution and water to neutrality. The dried extract was evaporated to drynes then the residue was purified on a silica column and crystallised from methanol to give 9α,11β-dichloro-165α,17α,21-trimethyl-Δ$^{1,4}$-pregnadiene-3,20-dione (500 mg), m.p. 200°-210°.

Repeat of the same procedure with 6α-fluoro-16α,17α,21-trimethyl-Δ$^{1,4,9(11)}$-pregnatriene-3,20-dione; 6α,16α,17α,21-tetramethyl-Δ$^{1,4,9(11)}$-pregnatriene-3,20-dione; and 16β,17α,21-trimethyl-Δ$^{1,4,9(11)}$-pregnatriene-3,20-dione; gave 6α-fluoro-9α,11β-dichloro-16α,17α,21-trimethyl-Δ$^{1,4}$-pregnadiene-3,20-dione (m.p. 225°-240°C decomp.); 6α,16α,17α,21-tetramethyl-9α,11β-dichloro-Δ$^{1,4}$-pregnadiene-3,20-dione (m.p. 218°-234°C decomp.); and 9α,11β-dichloro-16β,17α,21-trimethyl-Δ$^{1,4}$-pregnadiene-3,20-dione (m.p. 165°-166°C) respectively.

EXAMPLE 27

9α-Fluoro-16α,17α,21-trimethyl-Δ$^{1,4}$-pregnadiene-3,11,20-triene

To a stirred solution of 9α-fluoro-11β-hydroxy-16α,17α,21-trimethyl Δ$^{1,4}$-pregnadiene-3,20-dione (500 mg) in acetone (30 ml) at room temperature was slowly added 7.9N Jones' chromic acid reagent (1 ml).

After 10 minutes, isopropanol was added to destroy excess reagent, and the product was precipitated by the slow addition of water, filtered and dried. A solution of the solid in methylene chloride was run through a short column of alumina, evaporated to dryness and the residue crystallised from acetone/hexane to give 9α-fluoro-16α,17α,21-trimethyl-$\Delta^{1,4}$-pregnadiene-3,11,20-trione (440 mg), m.p. 190°–215°C.

When the same process was carried out on 9α-chloro-11β-hydroxy-16α,17α,21-trimethyl-$\Delta^{1,4}$-pregnadiene-3,20-dione; 9α-fluoro-11β-hydroxy-16α,17α,21,21-tetramethyl-$\Delta^{1,4}$-pregnadiene-3,20-dione; 11β-hydroxy-16α,17α,21-trimethyl-$\Delta^{1,4}$-pregnadiene-3,20-dione; 9α-fluoro-11β-hydroxy-16β,17α,21-trimethyl-$\Delta^{1,4}$-pregnadiene-3,20-dione; 1-1β-hydroxy-16β,17α,21-trimethyl-$\Delta^{1,4}$-pregnadiene-3,20-dione; and 6α-fluoro-11α-hydroxy-16α,17α,21-trimethyl-$\Delta^{1,4}$-pregnadiene-3,20-done; the products were 9α-chloro-16α,17α,21-trimethyl-$\Delta^{1,4}$-pregnadiene-3,11,20-trione (m.p. 242°–245°C); 9α-fluoro-16α,17α,21,21-tetramethyl-$\Delta^{1,4}$-pregnadiene-3,11,20-trione (m.p. 167°–171°C); 16α,17α,21-trimethyl-$\Delta^{1,4}$-pregnadiene-3,11,20-trione (m.p. 247°–249°C); 9α-fluoro-16β,17α,21-trimethyl-$\Delta^{1,4}$-pregnadiene-3,11,20-trione (m.p. 154°–155°C); 16β,17α,21-trimethyl-$\Delta^{1,4}$-pregnadiene-3,11,20-trione (m.p. 181°–182°C); and 6α-fluoro-16α,17α,21-trimethyl-$\Delta^{1,4}$-pregnadiene-3,11,20-trione (m.p. 218°–228°C) respectively.

EXAMPLE 28

9α-Chloro-11β-fluoro-16α,17α,21-trimethyl-$\Delta^{1,4}$-pregnadiene-3,20-dione

A solution of 16α,17α,21-trimethyl-$\Delta^{1,4,9(11)}$-pregnatriene-3,20-dione (2 g) in chloroform (50 ml) and pyridine (12 ml) was treated with a solution of hydrogen fluoride (3 g) in tetrahydrofuran (8 ml) and chloroform (4 ) followed by N-chlorosuccinimide (1 g). After a week at room temperature the reaction was poured into excess 10% sodium acetate solution and the product isolated via methylene chloride. The crude product was purified on a silica gel and crystallised from ether to give 9α-chloro-11β-fluoro-16α,17α,21-trimethyl-$\Delta^{1,4}$-pregnadiene-3,20-dione (1.2 g; m.p. 208°–211°C).

EXAMPLE 29

11β-Hydroxy-16α,17α,21-trimethyl-$\Delta^{1,4}$-pregnadiene-3,20-dione

A stirred solution of 11β-hydroxy-16α,17α,21-trimethyl-$\Delta^{1,4}$-pregnadiene-3,20-dione 11-acetate (22 g) in methanol (460 ml) was hydrolysed by addition of potassium hydroxide solution at room temperature. Excess alkali was neutralised with acetic acid and the product was precipitated with water, filtered, washed, dried, purified on a silica column, and crystallised from methylene chloride/methanol to give 11β-hydroxy-16α,17α,21-trimethyl-$\Delta^{1,4}$-pregnadiene-3,20-dione (m.p. 230°–273°C).

The above procedure, carried out on a mixture of 11-β-hydroxy-16α,17α,21-trimethyl-$\Delta^{1,4}$-pregnadiene-3,20-dione 11-propionate and 11-isobutyrate; and 11β-hydroxy-16α,17α,21-trimethyl-$\Delta^{1,4,6}$-pregnatriene-3,20-dione 11-propionate, gave 1β-hydroxy-16α,17α,21-trimethyl-$\Delta^{1,4}$-pregnadiene-3,20-dione (m.p. 230°–273°C) and 11β-hydroxy-16α,17α,21-trimethyl-$\Delta^{1,4,6}$-pregnatriene-3,20-dione (m.p. 226°–233°C) respectively.

EXAMPLE 30

11β-Hydroxy-16α,17α,21-trimethyl-$\Delta^{1,4}$-pregnadiene-3,20-dione

A solution of 16α,17α,21-trimethyl-$\Delta^{1,4,9(11)}$-pregnatriene-3,20-dione (2.5 g) in tetrahydrofuran (50 ml) containing perchloric acid was stirred for 1 hour at room temperature with N-bromosuccinimide (1.32 g). Excess reagent was destroyed with sodium bisulphite solution and the reaction mixture poured into water. The product was filtered and dried to give 9α-bromo-11β-hydroxy-16α,17α,21-trimethyl-$\Delta^{1,4}$-pregnadiene-3,20-dione (3.15 g).

The bromohydrin (3.15 g) in dimethylsulphoxide (80 ml) was added to a stirred solution of n-butane thiol (4.7 ml) and chromous acetate (9.5 g) in dimethylsulphoxide (42 m), left overnight at room temperature and then poured into sodium chloride solution. The product was filtered, dried, and recrystallised from methylene chloride/methanol to give 11β-hydroxy-16α,17α,21-trimethyl-$\Delta^{1,4}$-pregnadiene-3,20-dione (m.p. 230°–269°C).

The same process carried out on 16β,17α,21-trimethyl-$\Delta^{1,4,9(11)}$-pregnatriene-3,20-dione; 16α,21-dimethyl-$\Delta^{1,4,9(11)}$-pregnatriene-3,20-dione; 16α,17α,2-1,21-tetramethyl-$\Delta^{1,4,9(11)}$-pregnatriene-3,20-dione; 16-α,21,21-trimethyl-$\Delta^{1,4,9(11)}$-pregnatriene-3,20-dione; and 16α,17α-dimethyl-21-ethyl-$\Delta^{1,4,9(11)}$-pregnatriene-3,20-dione gave 11β-hydroxy-16β,17α,21-trimethyl-$\Delta^{1,4}$-pregnadiene-3,20-dione (m.p. 232°–240°C); 11β-hydroxy-16α,21-dimethyl-$\Delta^{1,4}$-pregnadiene-3,20-dione (m.p. 201°–204°C); 11β-hydroxy-16α,17α,21,21-tetramethyl-$\Delta^{1,4}$-pregnadiene-3,20-dione (m.p. 235°–239°C); 11β-hydroxy-16α,21,21-trimethyl-$\Delta^{1,4}$-pregnadiene-3,20-dione (m.p. 208°–214°C); and 11β-hydroxy-16α,17α-dimethyl-21-ethyl-$\Delta^{1,4}$-pregnadiene-3,20-dione (m.p. 221°–227°C) respectively.

EXAMPLE 31

11β-Hydroxy-16α,17α,21-trimethyl-$\Delta^4$-pregnene-3,20-dione and 11β-hydroxy-16α,17α,21-trimethyl-$\Delta^1$-5α-pregnene-3,20-dione A solution of 11β-hydroxy-16α,17α,21-trimethyl-5α-pregnane-3,20-diene 11-acetate (10 g) in acetic acid (100 ml) was treated with a 10% solution of bromine in acetic acid (2.73 ml). When reaction was complete, sodium acetate solution was added and the resulting solid filtered, washed and dried to give the crude product (12 g).

The crude mono-brominated product was added to a hot stirred mixture of dimethylformamide (100 ml) lithium bromide (2.5 g) and calcium carbonate (5g) under nitrogen. After 10 minutes the reaction mixture was cooled, poured into aqueous acetic acid and the product filtered, washed and dried.

The crude product (9.2 g) was heated under reflux for 8 hrs. with methanolic potassium hydroxide, cooled, neutralised with acetic acid, and poured into water. The product was filtered, washed with water, dried and purified by chromatography on silica gel to give 11β-hydroxy-16α,17α,21-trimethyl-$\Delta^4$-pregnene-3,20-dione (m.p. 200°–202°C). and 11β-hydroxy-16α,17α,21-trimethyl-$\Delta^1$-5α-pregnene-3,20-dione (m.p. 235°–243°C).

The above procedure carried out on 11β-hydroxy-16α,16α,27-trimethyl-5β-pregnane-3,20-dione 11-propionate gave a mixture of 11β-hydroxy- 16α,17α,21-trimethyl-Δ⁴-pregnene-3,20-dione (m.p. 200°–202°C) and 11β-hydroxy-16α,11α,21-trimethyl-Δ¹-5β-pregnene-3,20-dione (m.p. 252°–265°C).

EXAMPLE 32

11β-Hydroxy-16α,11α,21-trimethyl-Δ⁴-pregnene-3,20-dione 11-propionate (3 g) and dichlorodicyanoquinone (1.94 g) were dissolved in dioxan (50 ml). Hydrogen chloride gas was passed into the solution until a precipitate started to form and the reaction mixture was allowed to stand for a further 20 minutes. The solid was removed by filtration and the filtrate was poured into aqueous sodium carbonate solution. The product was isolated via ether and purified by chromatography on silica gel to give 11β-hydroxy-16α,17α,21-trimethyl-Δ⁴,⁶-pregnadiene-3,20-dione 11-propionate (2 g) as an amorphous solid.

EXAMPLE 33

11β-Hydroxy-16α,17α,21-trimethyl-Δ¹,⁴,⁶-pregnatriene-3,20-dione 11-propionate

A solution of 11β-hydroxy-16α,17α,21-trimethyl-Δ⁴,⁶-pregnadiene-3,20-dione 11-propionate (1.8 g) in dioxam (40ml) containing dichlorodicyanoquinone (1.3 g) was refluxed overnight. The cooled reaction mixture was worked up as described in example 21 to give 11β-hydroxy-16α,17α,21-trimethyl-Δ¹,⁴,⁶pregnatriene-3,20-dione 11-propionate (m.p. 180°–189°C).

EXAMPLE 34 a. 3β,11α-Dihydroxy-5α,6α-epoxy-16α,17α,21-trimethyl-5α-pregnan-20-one diacetate A solution of crude 3β,11α-dihydroxy-16α,17α,21-trimethyl-Δ⁵-pregnen-20-one (22 g) from Example 4 in chloroform (220 ml) was stirred with peracetic acid (22 ml) and sodium acetate (2.2 g) for one hour, after which excess peracid was destroyed by careful addition of sodium sulphite solution. The organic phase was washed neutral, dried over sodium sulphate, and evaporated to dryness. The gummy residue was acetylated and purified first by chromatography on silica and then by crystallisation from methanol to give 3β,11α-dihydroxy-5α,6α-epoxy-16α,17α,21-trimethyl-5α-pregnan-20-one diacetate (10.5g), m.p. 179°–183°C.

b. 3β,5α,11α-Trihydroxy-6β-fluoro-16α,17α,21-trimethyl-5α-pregnan-20-one 3,11-diacetate 3β,11α-Dihydroxy-5α,6α-epoxy-16α,17α,27-trimethyl-5α-pregnan-20-one diacetete (5 g) was dissolved in diglyme (50 ml) and treated with boron trifluoride etherate (5 ml) and a solution of hydrogen fluoride in diglyme (4 ml of 9N). After five minutes the reaction mixture was poured into water (500 ml) containing sodium acetate (5 g). The product was filtered and dried to give 3β,5α,11α-trihydroxy-6β-fluoro-16α,17α,21-trimethyl-5α-pregnan-20-one 3,11-diacetate (5.2 g) as an amorphous solid which could not be crystallised.

c. 3β,5α,11α-Trihydroxy-6β-fluoro-16α,17α,21-trimethyl-5α-pregnan-20-one 11-acetate 3β,5α,11α-Trihydroxy-6β-fluoro-16α,17α,21-trimethyl-5α-pregnan-20-one 3,11-diacetate (5.2 g) was dissolved in methanol (50 ml) and 70% perchloric acid (5 ml). After 3 hours, the reaction mixture was buffered with sodium acetate, concentrated and poured into water (250 ml). The product was extracted into ether, washed neutral, dried and evaporated to dryness. The crude product was purified by chromatography on a silica column to give 3β,5α,11α-trihydroxy-6β-fluoro-16α,17α,21-trimethyl-5α-pregnan-20-one 11-acetate (4 g) as a clear gum which could not be crystallised.

d. 5α,11α-Dihydroxy-6β-fluoro-16α,17α,21-trimethyl-5α-pregnane-3,20-dione 11-acetate A solution of 3β, 5α, 11α-trihydroxy-6β-fluoro-16α, 17α, 21-trimethyl-5α-pregnan-20-one 11-acetate in acetone (20 ml) was treated with 8N chromic acid solution (3 ml) dropwise with stirring and external cooling. When the oxidation was complete, methanol was added to decompose excess reagent and the reaction mixture was diluted with water (200 ml) to give a gummy product which was extracted into methylene chloride/ether. The washed and dried extract was evaporated to dryness to give 5α, 11α-dihydroxy-6β-fluoro-16α, 17α, 21-trimethyl-5α-pregnane-3,20-dione 11-acetate (3.8 g) as an intractable gum.

e. 6α-Fluoro-11α-hydroxy-16α,17α,21-trimethyl-Δ⁴-pregnene-3,20-dione acetate

5α,11α-Dihydroxy-6β -fluoro-16α, 17α, 21-trimethyl-5α-pregnan-20-one 11-acetate (3.8 g) was dissolved in acetic acid (20 ml), and hydrogen chloride gas was passed into the solution for 10 minutes. After standing at room temperature for 15 hours, the solution was poured into water (250 ml) and the product was extracted into methylene chloride/ether. The extract was washed neutral, dried and evaporated to dryness. The crude product was purified on a short column of alumina and crystallised from acetone/ether to give 6α-fluoro-11α-hydroxy-16α, 17α, 21-trimethyl-Δ⁴-pregnene-3,20-dione acetate (2.8 g), m.p. 174°–178°C.

EXAMPLE 35

6α-Fluoro-11α-hydroxy-16α, 17α, 21-trimethyl-Δ¹,⁴-pregnadiene-3,20-dione acetate 6α-Fluoro-11α-hydroxy-16α, 17α, 21-trimethyl-Δ⁴-pregnene-3,20-dione acetate (2.7 g) in benzene (30 ml) was heated under reflux for 15 hours with 2.3-dichloro-5,6-dicyanobenzoquinone (1.7 g). The reaction mixture was cooled, filtered, and the filtrate was evaporated to dryness. The crude product was purified on a short column of alumina and crystallised to give 6α-fluoro-11α-hydroxy-16α, 17α, 21-trimethyl-Δ¹,⁴-pregnadiene-3,20-dione acetate (1.75 g), m.p. 136°–144°C.

EXAMPLE 36

6α-Fluoro-11α-hydroxy-16α, 17α, 21-trimethyl-Δ¹,⁴-pregnadiene-3,20-dione

6α-Fluoro-11α-hydroxy-16α, 17α, 21-trimethyl-Δ¹,⁴-pregnadiene-3,20-dione acetate (1.6 g) was dissolved in methanol (30 ml) and heated at reflux with potassium carbonate (0.5 g) for one hour. The solution was cooled, acidified, poured into water and the solid filtered, washed and dried to give 6α-fluoro-11α-hydroxy-16α, 17α, 21-trimethyl-Δ¹,⁴-pregnadiene-3,20-dione (1.4 g), m.p. 175°–182°C.

EXAMPLE 37 a. 6α-Fluoro-11α-hydroxy-16α, 17α, 21-trimethyl-Δ¹,⁴-pregnadiene-3,20-dione 11-mesylate 6α-Fluoro-11α-hydroxy-16α, 17α, 21-trimethyl-Δ¹,⁴-pregnadiene-3,20-dione (1.4 g) was dissolved in pyridine (10 ml), cooled to 0°C and treated with methane sulphonyl chloride (0.8 ml). The reaction was allowed to stand at 0°C for 16 hours. The reaction mixture was poured on to ice and the product was filtered, washed and dried to give 6α-fluoro-11α-hydroxy-16α, 17α, 21-trimethyl-Δ$^{1,4}$-pregnadiene-3,20-dione 11-mesylate which was not purified further.

b. 6α-Flouro-16α, 17α, 21-trimethyl-Δ$^{1,4,9(11)}$-pregnatriene-3,20-dione

Crude 6α-fluoro-11α-hydroxy-16α, 17α, 21-trimethyl-Δ$^{1,4}$-pregnadiene-3,20-dione 11-mesylate (1.75 g) was dissolved in dimethylformamide (30 ml) containing anhydrous sodium acetate (1.5 g) and heated at reflux for 2 hours. The reaction mixture was cooled, poured into water (500 ml), and the crude product was filtered, washed and dissolved in methylene chloride. The solution was dried, evaporated to dryness, and the product was purified on a short column of alumina and crystallised from methanol to give 6α-fluoro-16α, 17α, 21-trimethyl-Δ$^{1,4,9(11)}$-pregnatriene-3,20-dione (0.82 g), m.p. 192°–202°C.

EXAMPLE 38

6α, 16α, 17α, 21-Tetramethyl-Δ$^{1,4,9(11)}$-pregnatriene-3,20-dione

3β, 11α-Dihydroxy-5,6α-epoxy-16α, 17α, 21-trimethyl-5α-pregnan-20-one diacetate (5 g) dissolved in sodium-dried benzene (100 ml) was added over 15 minutes to a stirred solution of methyl magnesium bromide (made from 2g of magnesium) in ether (85 ml) under nitrogen. During the addition, the reaction was heated so that the ether slowly distilled and after the addition was complete, further sodium-dried benzene was added and heating continued with distillation until the vapour temperature had reached 80° C. The reaction was then refluxed for 6 hours.

The cooled mixture was poured into ice water containing 5N sulphuric acid (25 ml) and the organic phase was separated, washed neutral, dried over sodium sulphate, and evaporated to dryness. The residue was reacetylated with pyridine/acetic anhydride in the usual way, and purified on a column of silica to give 3β, 5α, 11α-trihydroxy-6β, 16α, 17α, 21-tetramethyl-5α-pregnan -20-one 3,11-diacetate (4.9 g) as an intractable gum.

This product was converted by the same series of reactions as described in Examples 34 c–37 b to give 6α, 16α, 17α, 21 -tetramethyl-Δ$^{1,4,9(11)}$-pregnatriene-3,20-dione, m.p. 160°–165°C.

EXAMPLE 39 a. 3β-Hydroxy-5α,6αepoxy-16α,17α,21-trimethyl-5α-pregnan-20-one 3-acetate

A solution of 3β-hydroxy-16α, 17α, 21-trimethyl-Δ$^5$-pregnen-20-one (20 g) in chloroform (200 ml) at 0°C was treated with peracetic acid (20 ml) containing sodium acetate (2 g). The stirred solution was allowed to warm up to room temperature and after 1.5 hours the reaction was cooled to 5°C and treated with sodium sulphite solution. The product was extracted with methylene chloride, washed, dried and evaporated to dryness.

The gummy residue was acetylated and crystallised from methylene chloride/methanol to give 3β-hydroxy-5α, 6α-epoxy-16α, 17α, 21-trimethyl-5α-pregnan-20-one 3-acetate (m.p. 180°–186°C).

b. 6α, 16α, 17α, 21-Tetramethyl-Δ$^4$-pregnene-3,20-dione

3β-Hydroxy-5α, 6α-epoxy-16α, 17α, 21-trimethyl-5α-pregnen-20 3-acetate (15 g) was treated with methyl magnesium bromide exactly as described in Example 43.

The cooled mixture was worked up in the usual way to give 3β, 5α-dihydroxy-6β, 16α, 17α, 21-tetramethyl-5α-pregnan-20-one.

The crude 3β, 5α-diol (14.5 g) in acetone (450 ml) was oxidised with 8N chromic acid solution by the procedure described in Example 37, to give 5α-hydroxy-6β, 16α, 17α, 21-tetramethyl-5α-pregnan-3,20-dione.

Crude 5α-hydroxy-6β, 16α, 17α, 21-tetramethyl-5α-pregnan-3,20-dione (13.9 g) was stirred overnight in acetic acid (200 ml) containing hydrogen chloride at room temperature and worked up to give 6α, 16α, 17α, 21-tetramethyl-Δ$^4$-pregnene-3,20-dione (m.p. 162°–166°C).

EXAMPLE 40

6α-Fluoro-16α, 17α, 21-trimethyl-Δ1,4-pregnadiene-3,20-dione

A solution of 6α-fluoro-16α, 17α, 21-trimethyl-Δ$^1$-pregnene-3,20-dione (3.35 g) and 2,3-dichloro-5,6-dicyano-benzoquinone (2.44 g) in benzene (50 ml) was heated under reflux with stirring overnight. The solution was cooled and the hydroquinone was removed by filtration. The filtrate was diluted with benzene, washed with water, potassium bicarbonate solution, then with brine to neutrality, dried, concentrated under vacuum and passed through a column of alumina, washing through with ether. The solvent was evaporated and the residue was crystallised from methylene chloride/methanol to give 6α-fluoro-16α, 17α, 21-trimethyl-Δ$^{1,4}$-pregnadiene-3,20-dione (2.35 g), m.p. 190°–193°C.

The above procedure, when carried out on 6α, 16α, 17α, 21-tetramethyl-Δ$^4$pregnene-3,20-dione gave 6α, 16α, 17α, 21-tetramethyl-Δ$^{1,4}$-pregnadiene-3,20-dione (m.p. 149°–156°C) and when carried out on 16α, 17α, 21-trimethyl-Δ$^4$-pregnene-3,20-dione gave 16α, 17α, 21-trimethyl-Δ$^{1,4}$-pregnadiene-3,20-dione.

EXAMPLE 41

16α,17α-Dimethyl-21-ethyl-Δ$^{9(11)}$-5α-pregnene-3,20-dione

A solution of 16α,17α-dimethyl-Δ$^{9(11)}$-5α-pregnene-3,20-dione 3-dimethylketal (2 g) in sodium-dried tetrahydrofuran (50 ml) was slowly added to a stirred solution of lithium di-isopropylamide (1.5 mole equivalents; prepared from 1.23 ml di-isopropylamine) in tetrahydrofuran (8 ml) under nitrogen at 0°C. The solution was stirred for 30 minutes, allowing it to warm to room temperature, then was again cooled to 0°C, and ethyl iodide (12 ml) was added rapidly with vigorous stirring. The cooling bath was again removed, and after a further 30 minutes, the solution was evaporated to dryness. The residue was dissolved in 80% acetic acid (25 ml) and after 30 minutes on a steam bath the product was precipitated by the slow addition of water. The product was filtered, washed with water, dried and crystallised from acetone/hexane to give 16α, 17α-dimethyl-21-ethyl-Δ$^{9(11)}$-5αpregnene-3,20-dione (1.8 g), m.p. 156°–160°C.

We claim:

1. An alkylated 3,20-diketo-Δ$^4$-steroid of the pregnane series having the formula:

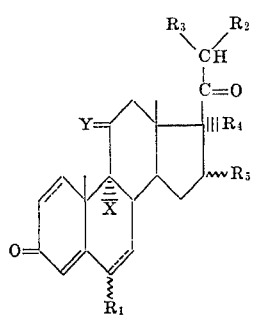

wherein
- X = a member of the group consisting of H and halogen;
- Y = a member of the group consisting of H, H(OH), H(OAcyl), O and halogen;
- $R_1$ = a member of the group consisting of H, $CH_3$ and halogen;
- $R_2$ and $R_3$ = alkyl having 1–4 carbon atoms;
- $R_4$ = a member of the group consisting of H (except when Y = H), OH, OAcyl, OAlkyl and $CH_3$;
- $R_5$ = a member of the group consisting of H and alkyl having 1–4 carbon atoms;

and in which at least one of the substituents $R_4$ and $R_5$ is alkyl, and $C_1$–$C_2$ and $C_6$–$C_7$ are selected from a saturated and an unsaturated bond.

2. A steroid of the formula:

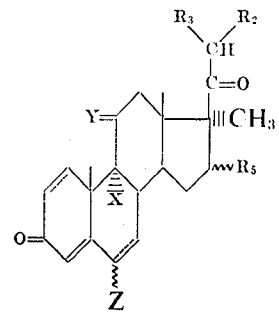

wherein
X, Y, $R_2$ and $R_3$ have the meanings defined in claim 1 and
Z = a member of the group consisting of H, $CH_3$, F and Cl.

3. 9α-Fluoro-16α, 17α, 21,21-tetramethyl-$\Delta^{1,4}$-pregnadiene-3,11,20-trione.

4. 11β-Hydroxy-16α, 21,21-trimethyl-$\Delta^{1,4}$-pregnadiene-3,20-dione.

* * * * *

UNITED STATES PATENT OFFICE
CERTIFICATE OF CORRECTION

Patent No. 3,862,194        Dated January 21, 1975

Inventor(s) Gilbert Frederick Woods, et al.

It is certified that error appears in the above-identified patent and that said Letters Patent are hereby corrected as shown below:

Claim 1, column 21, line 17, "H" should read --$H_2$--; line 18, "halogen" should read --H(halogen)--; line 23, "H)" should read --$H_2$--.

Signed and sealed this 1st day of July 1975.

(SEAL)
Attest:

RUTH C. MASON
Attesting Officer

C. MARSHALL DANN
Commissioner of Patents
and Trademarks